US007800578B2

(12) United States Patent
Shih et al.

(10) Patent No.: US 7,800,578 B2
(45) Date of Patent: Sep. 21, 2010

(54) METHOD FOR DRIVING A LIGHT SOURCE AND A BACKING LIGHT SOURCE

(75) Inventors: Chih Tsung Shih, Hsinchu (TW); Shih Tsai Huang, Chiayi County (TW); Hsin Yu Tsai, Hsinchu County (TW); Hung Lieh Hu, Hsinchu County (TW)

(73) Assignee: Industrial Technology Research Institute, Hsinchu County (TW)

( * ) Notice: Subject to any disclaimer, the term of this patent is extended or adjusted under 35 U.S.C. 154(b) by 801 days.

(21) Appl. No.: 11/685,972

(22) Filed: Mar. 14, 2007

(65) Prior Publication Data

US 2008/0129224 A1 Jun. 5, 2008

(30) Foreign Application Priority Data

Dec. 1, 2006 (TW) .............................. 95144598 A

(51) Int. Cl.
*G09G 3/36* (2006.01)
*G06F 3/038* (2006.01)
*A47F 3/00* (2006.01)

(52) U.S. Cl. ....................... 345/102; 345/204; 345/214; 362/561

(58) Field of Classification Search ............. 345/72–86, 345/102, 204–214; 315/169.3, 169.4, 307; 349/71; 362/561
See application file for complete search history.

(56) References Cited

U.S. PATENT DOCUMENTS 6,115,016 A * 9/2000 Yoshihara et al. ............. 345/88
6,570,554 B1 * 5/2003 Makino et al. .............. 345/102

* cited by examiner

*Primary Examiner*—Bipin Shalwala
*Assistant Examiner*—Sosina Abebe
(74) *Attorney, Agent, or Firm*—WPAT, P.C.; Anthony King

(57) ABSTRACT

A method for driving a light source first sets a frame time and a unit time, and calculates the number of the unit time that the frame time can contain. Based on the turned-on duration (DTi) of a light-emitting device of the light source and the unit time, the turned-on numbers (Ni) and the compensation times (CTI) of the light-emitting devices are calculated. The light-emitting device is driven to emit a light beam according to the turned-on numbers (Ni) and the compensation times (CTI). The present driving method can be applied to light source and backing light source of liquid crystal displays.

20 Claims, 11 Drawing Sheets

METHOD FOR DRIVING A LIGHT SOURCE AND A BACKING LIGHT SOURCE

BACKGROUND OF THE INVENTION (A) Field of the Invention

The present invention relates to a method for driving a light source and a backing light source, and more particularly, to a method for driving a light source and a backing light source with a power supply outputting quasi-constant current.

(B) Description of the Related Art

Light sources using light-emitting diodes (LEDs) possesses valuable characteristics such as high smoothness, high brilliance, mercury-free design, high color reproduction, space efficiency, etc.; therefore, higher value is added to electronic products (e.g., liquid crystal display units) using such light sources. As flat-screen television units have become increasingly popular among consumers and have gradually replaced CRT units as the market standard, manufactures in related fields seek a backing light source with preferred color representation. Since LEDs may achieve a brighter color gamma and have the advantage of a longer lifetime, these are the focus in the development of the flat-screen TV.

FIGS. 1 and 2 show conventional LEDs 16A, 16B and 16C, and a light source 10 using the same. In the light source 10, a pulse width modulation (PWM) signal generator 12 is used to generate turned-on signals, drivers (switching transistors) 18A, 18B and 18C are then conducted according to the turned-on signals such that a power supply 14 provides current through the blue LED 16A, the green LED 16B and the red LED 16C to emit blue light beams, green light beams and red light beams, which are combined into a white light. The turned-on signal generated by the PWM signal generator 12 is used to control the turned-on duration of the switching transistors 18A, 18B and 18C, and further controls the light-emitting time of the blue LED 16A, the green LED 16B and the red LED 16C.

Referring to FIG. 2, although the current flowing through the blue LED 16A, the green LED 16B and the red LED 16C are the same in magnitude, the power supply 14 must be switched three times within one cycle time, so that the output current of the power supply 14 is not a constant value. In general, the power supply 14 includes energy storage elements such as capacitors and inductors, and the switching operation makes the energy storage elements waste stored energy, resulting in an inefficient use of power output by the power supply 14.

SUMMARY OF THE INVENTION

One aspect of the present invention provides a method for driving a light source and a backing light source with a power supply outputting quasi-constant current.

A method for driving a light source according to this aspect of the present invention comprises the steps of setting a frame time (FT) and a unit time (UT) and calculating the number (M) of the unit time that the frame time can contain, calculating turned-on numbers (Ni) and a compensation time (CTi) of a light-emitting device of the light source according to a turned-on duration (DTi) of the light-emitting device and the unit time (UT), and driving the light-emitting device to emit a light beam according to the turned-on numbers (Ni) and the compensation time (CTi).

Another aspect of the present invention provides a method for driving a backing light source comprising the steps of setting a frame time (FT) and a unit time (UT), calculating the number (M) of the unit time that the frame time can contain, calculating turned-on numbers (Ni) and a compensation time (CTi) of a light-emitting device of the backing light source according to a turned-on duration (DTi) of the light-emitting device and the unit time (UT), and driving the light-emitting device to emit a light beam according to the turned-on numbers (Ni) and the compensation time (CTi).

Compared with the prior art, the present invention divides the turned-on duration (i.e., the duty time) of each LED into N pieces of unit times (UT) and a compensation time, and the driver is conducted according to the N pieces of unit times (UT) in the frame time to cause the current supplied by the power supply to flow to the LEDs. If the frame time is not long enough to execute the N pieces of unit times (UT), the driver uses the compensation time (CT) for compensation. In this manner, the current supplied by the power supply in the frame time (FT) is constant, and the current supplied by the power supply in the compensation time (CT) is also constant, which effectively reduces the electrical power for driving the LED array, and thereby provides the light source with the features of power efficiency and high reliability.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
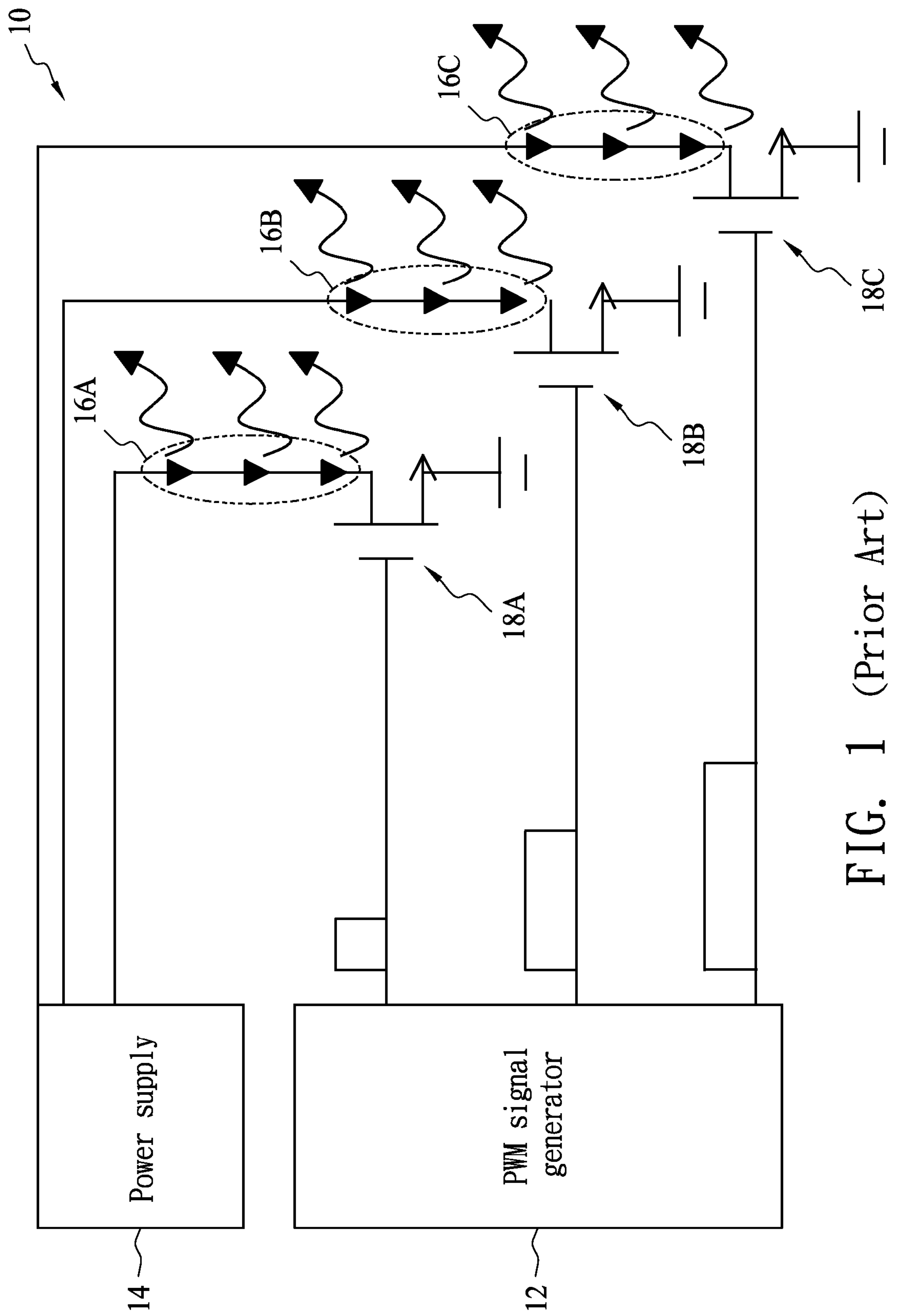
FIG. 1 (Prior Art)
FIGS. 1 and 2 show conventional LEDs and a light source using the same.
Figure 2:
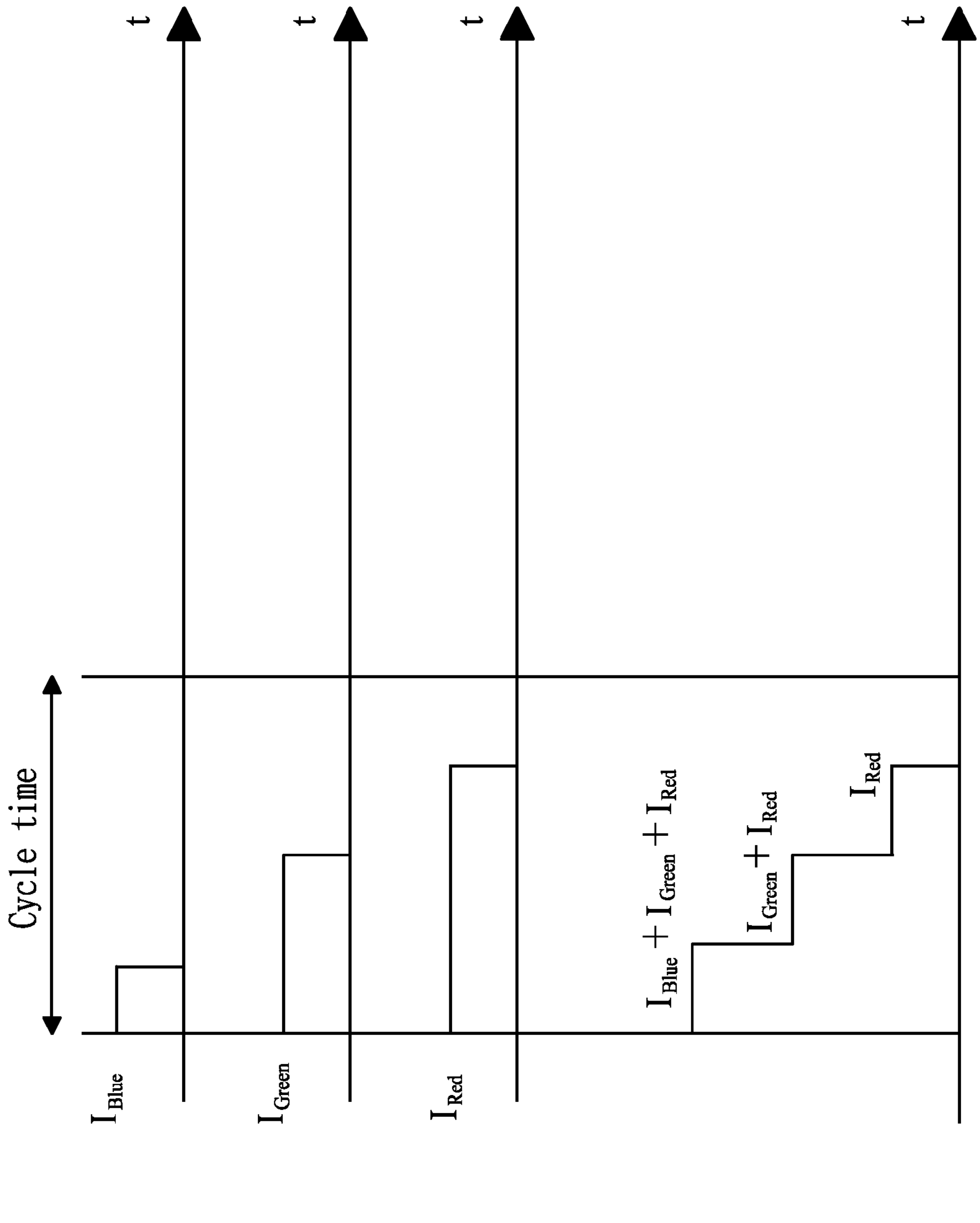
FIG. 2 (Prior Art)
Figure 3:
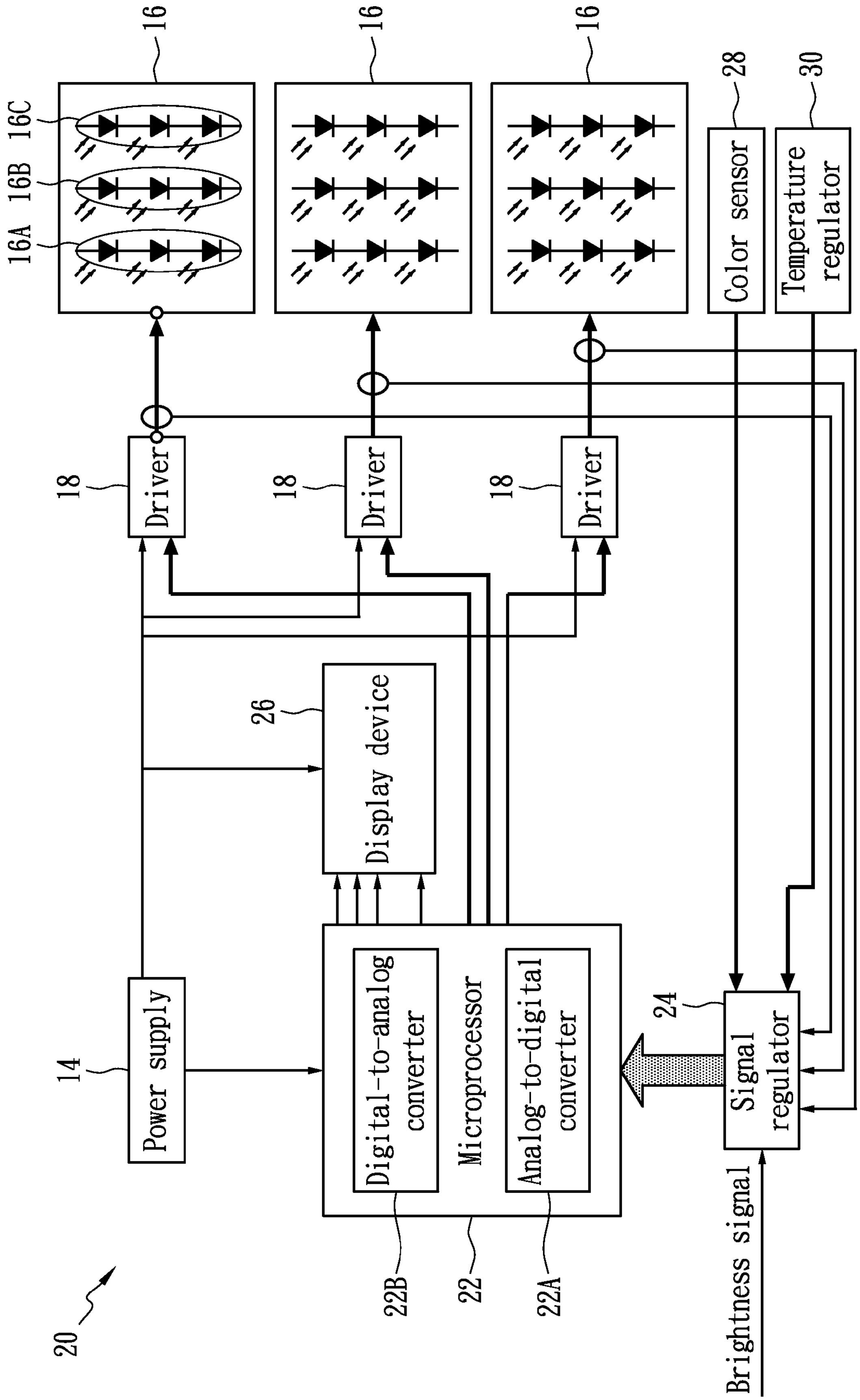
FIG. 3 illustrates a backing light source of a liquid crystal display.

FIG. 3 illustrates a backing light source 20 of a liquid crystal display. The backing light source 20 includes a microprocessor 22 configured to generate control signals, a plurality of drivers 18 configured to conduct a power supply 14 to supply current according to the control signal so as to drive a plurality of light-emitting modules 16 and a signal regulator 24 configured to generate a feedback signal according to a sensing signal of a color sensor 28 or a temperature regulator 30. The microprocessor 22 includes an analog-to-digital converter 22A configured to convert the feedback signal to a digital signal and a digital-to-analog converter 22B configured to convert the digital signal to an analog signal, and a display device 26 is used to display the analog signal output from the digital-to-analog converter 22B.

Figure 4:
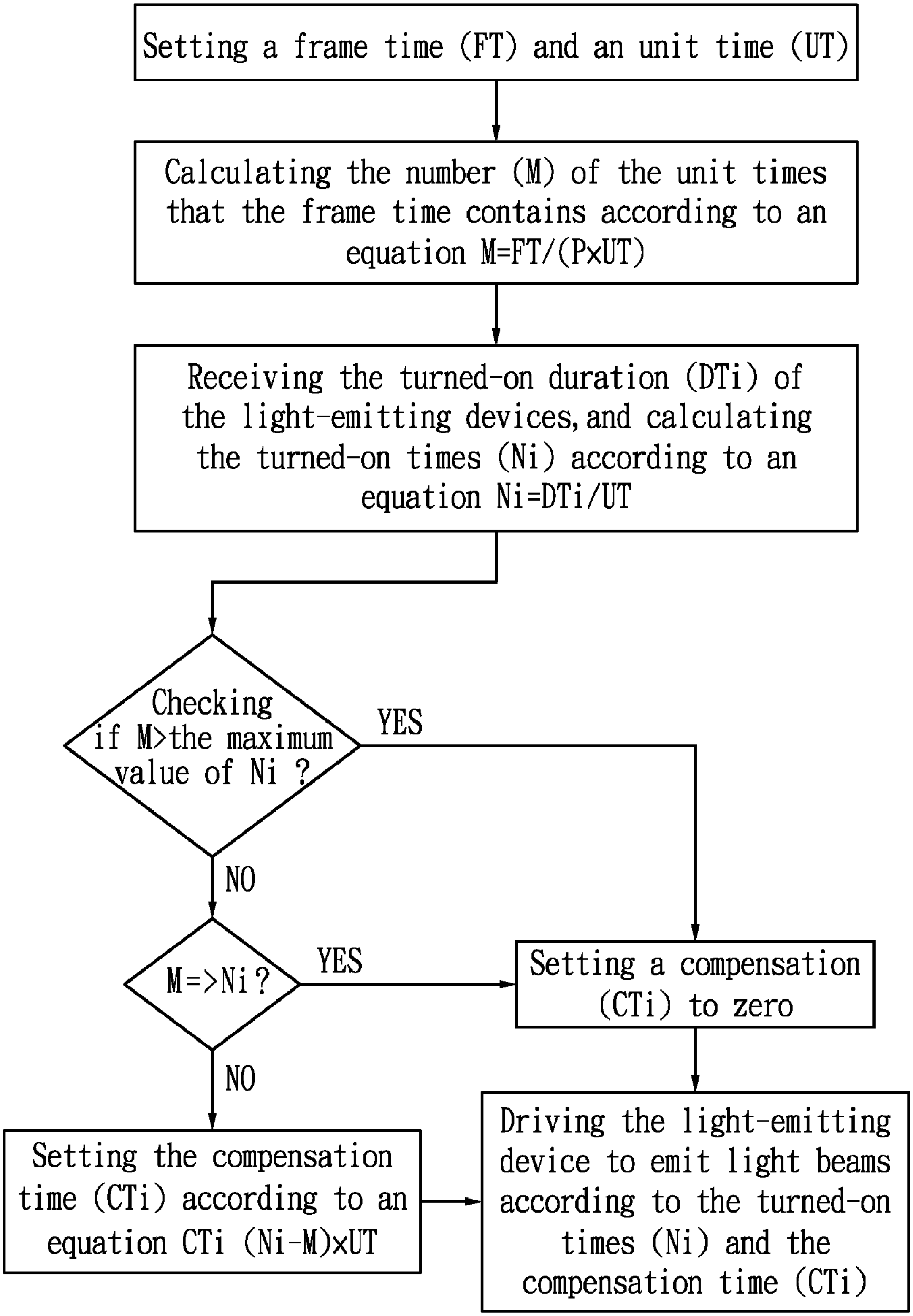
FIG. 4 illustrates a method for driving the backing light source according to one embodiment of the present invention.

FIG. 4 illustrates a method for driving the backing light source 20 according to one embodiment of the present invention. A frame time (FT) and a unit time (UT) are set, and the number (M) of the unit time that the frame time can contain is calculated according to an equation $M=FT/(P\times UT)$. Next, according to the turned-on duration (DTi) of the light-emitting devices 16A, 16B and 16C of the light source 20 and the unit time (UT), the turned-on numbers (Ni) and the compensation times (CTi) of the light-emitting devices 16A, 16B and 16C are calculated. Subsequently, according to the turned-on numbers (Ni) and the compensation times (CTi), the light-emitting devices 16A, 16B and 16C are driven to emit light beams.

P is a positive integer and represents the number of the LEDs of the light-emitting module 16. In this embodiment, three LEDs 16A, 16B and 16C are included, and P=3. The LED 16A may be formed of the blue diode, the LED 16B may be formed of the green diode, the LED 16C may be formed of the red diode, and these diodes form a light source. Particularly, P may be larger than or equal to 3, for example, two green LEDs, one blue LED and one red LED are used, and thus P=4.

As for the process for calculating the turned-on numbers (Ni) and the compensation times (CTi) of the LEDs 16A, 16B and 16C, the turned-on duration (DTi) of the LEDs 16A, 16B and 16C are received, and the turned-on numbers (Ni) of the LEDs 16A, 16B and 16C are calculated according to an equation Ni=DTi/UT. Next, a comparison step is performed to check if M is larger than the maximum value of Ni, and the compensation times (CTi) of the light-emitting devices 16A, 16B and 16C are set to zero if the checking result is "yes". In addition, the compensation times (CTi) are set to zero if the checking result is "no" and M is larger than or equal to Ni; the compensation time is set a value calculated according to the equation CTi=(Ni−M)×UT if the checking result is "no" and M is smaller than Ni.

Figure 5:
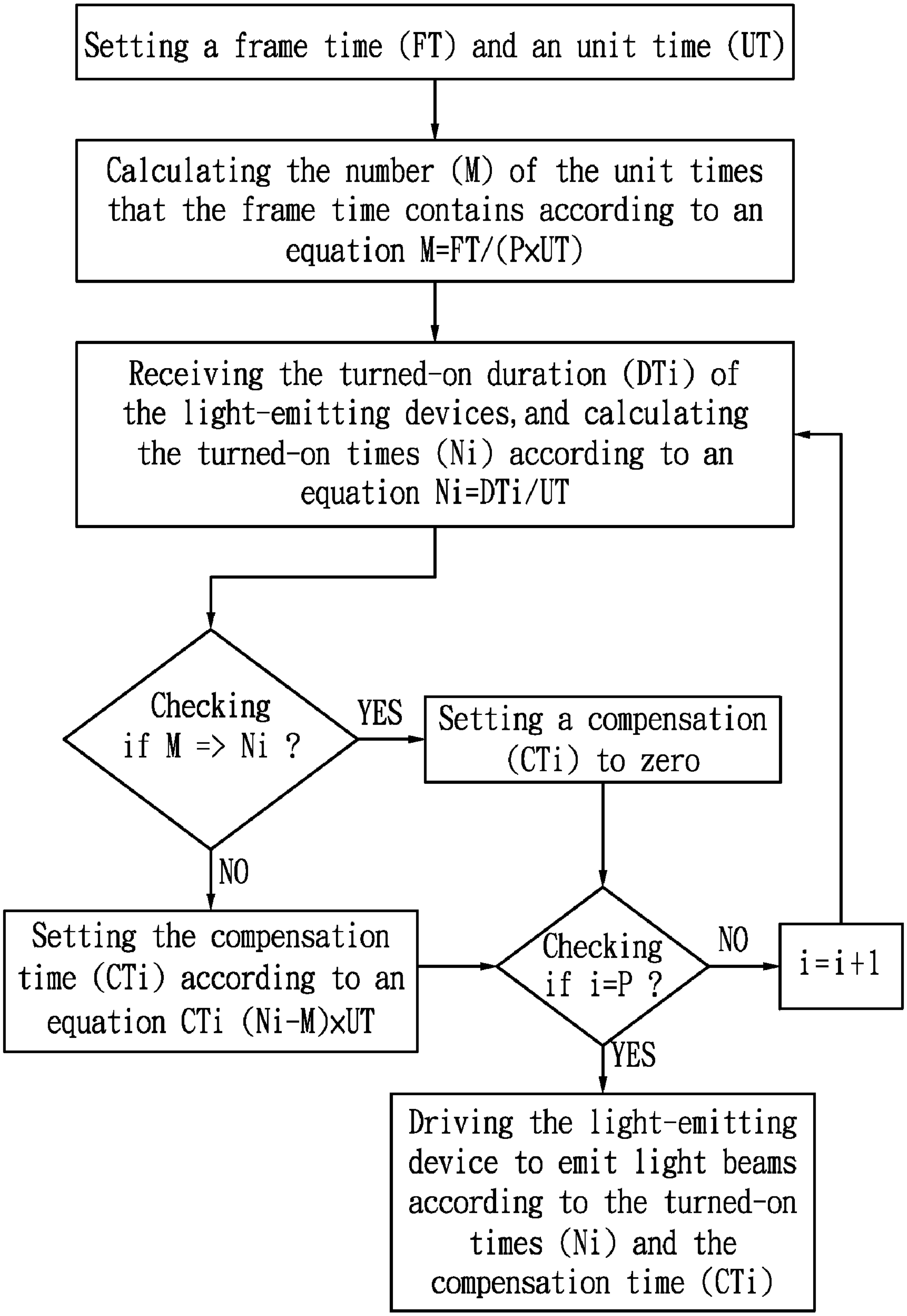
FIG. 5 shows a method for driving the backing light source according to another embodiment of the present invention.

FIG. 5 shows a method for driving the backing light source 20 according to another embodiment of the present invention. The difference between embodiments disclosed in FIG. 4 and FIG. 5 is that the processes for calculating the turned-on numbers (Ni) and the compensation times (CTi) of the LEDs 16A, 16B and 16C are different. Referring to FIG. 5, as for the calculating flow of the turned-on numbers (Ni) and the compensation times (CTi) of the LEDs 16A, 16B and 16C, a step (a) is performed to receive a turned-on duration (DTi) of the LED and the turned-on numbers (Ni) are calculated according to an equation Ni=DTi/UT. Next, a step (b) is performed to set the compensation times (CTi) to zero if M is larger than or equal to Ni or set the compensation times according to the equation CTi=(Ni−M)×UT if M is smaller than Ni. Subsequently, steps (a) and (b) are repeated for predetermined times, until i=P, i.e., the calculation of the turned-on numbers (Ni) and the compensation times (CTi) of the LEDs 16A, 16B, and 16C is completed.

Figure 6:
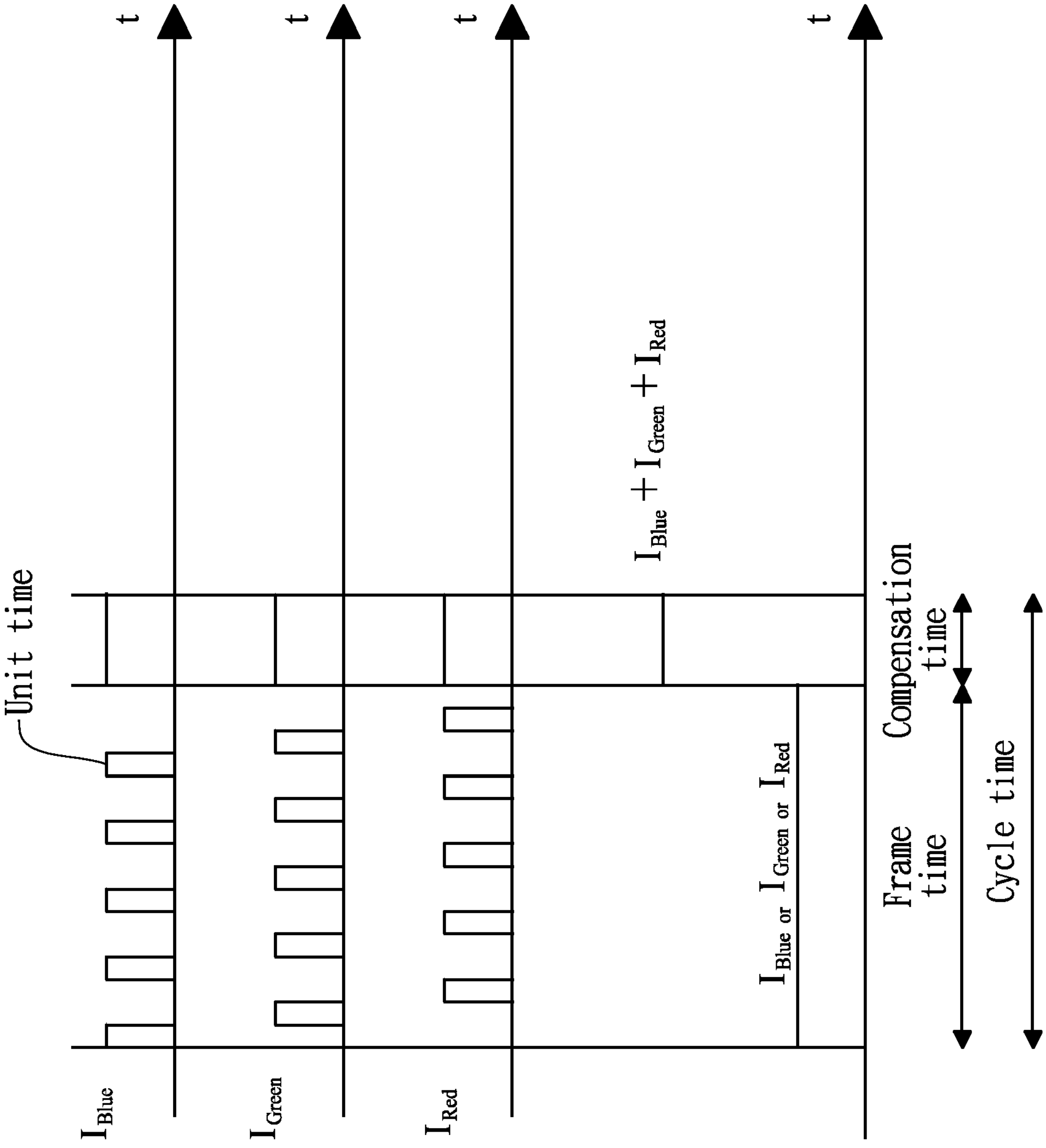
FIGS. 6 and 7 show a waveform chart of the driving signals according to the present invention.
Figure 7:
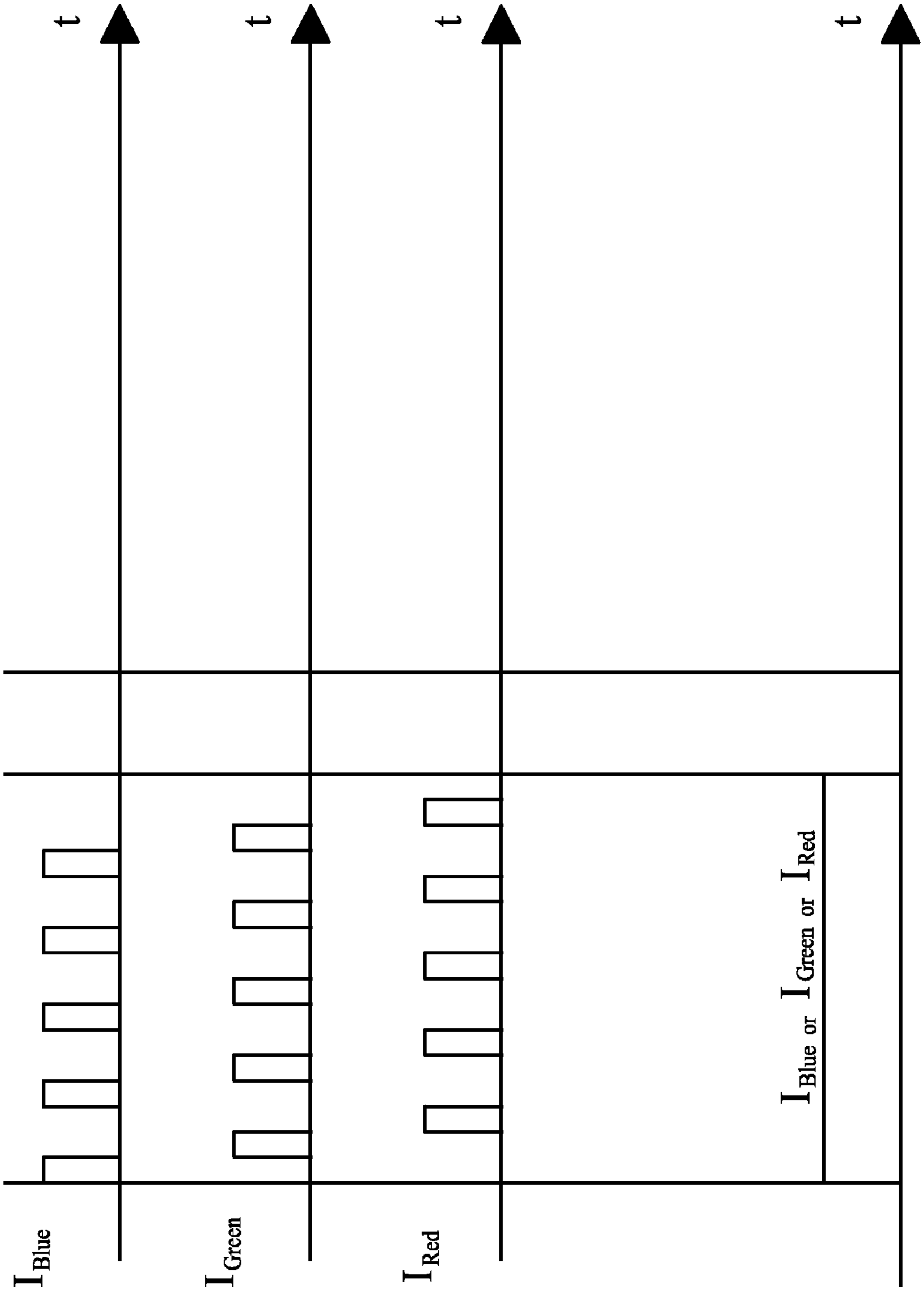

Referring to FIGS. 6 and 7, the turned-on duration (i.e., duty time) of each light-emitting device is divided into N pieces of unit times (UT) and a compensation time (CT) according to the present invention. If the sum of M pieces of unit times (UT) is smaller than the turned-on duration of each light-emitting device, i.e., M is smaller than N, the compensation time (CT) is used to compensate the difference between M and N. Particularly, the turned-on duration of each light-emitting device is equal to the sum of the unit times in the frame time and the compensation times. FIG. 6 shows that the turned-on duration of each light-emitting device is the same, i.e., it is equal to the sum of five unit times and the compensation time.

In this manner, the driver 18 only conducts the power supply 14 to supply current to one of the three light-emitting devices 16A, 16B and 16C within the frame time such that the current supplied by the power supply 14 is constant in the frame time and the current supplied by the power supply 14 is also constant ($I_{Blue}+I_{Green}+I_{Red}$) in the compensation time (CT). In other words, the power supply 14 outputs a quasi-constant current, as shown in FIG. 6. On the other hand, if the sum of M pieces of unit times (UT) is larger than or equal to the turned-on duration of each light-emitting device, i.e., M is larger than or equal to N, it is not necessary to use the compensation time (CT), and the compensation time (CT) is set to zero. In this manner, the current supplied by the power supply 14 in the frame time is constant and the current supplied by the power supply 14 in the compensation time (CT) is zero, i.e., the power supply 14 also outputs a quasi-constant current, as shown in FIG. 7.

Figure 8:
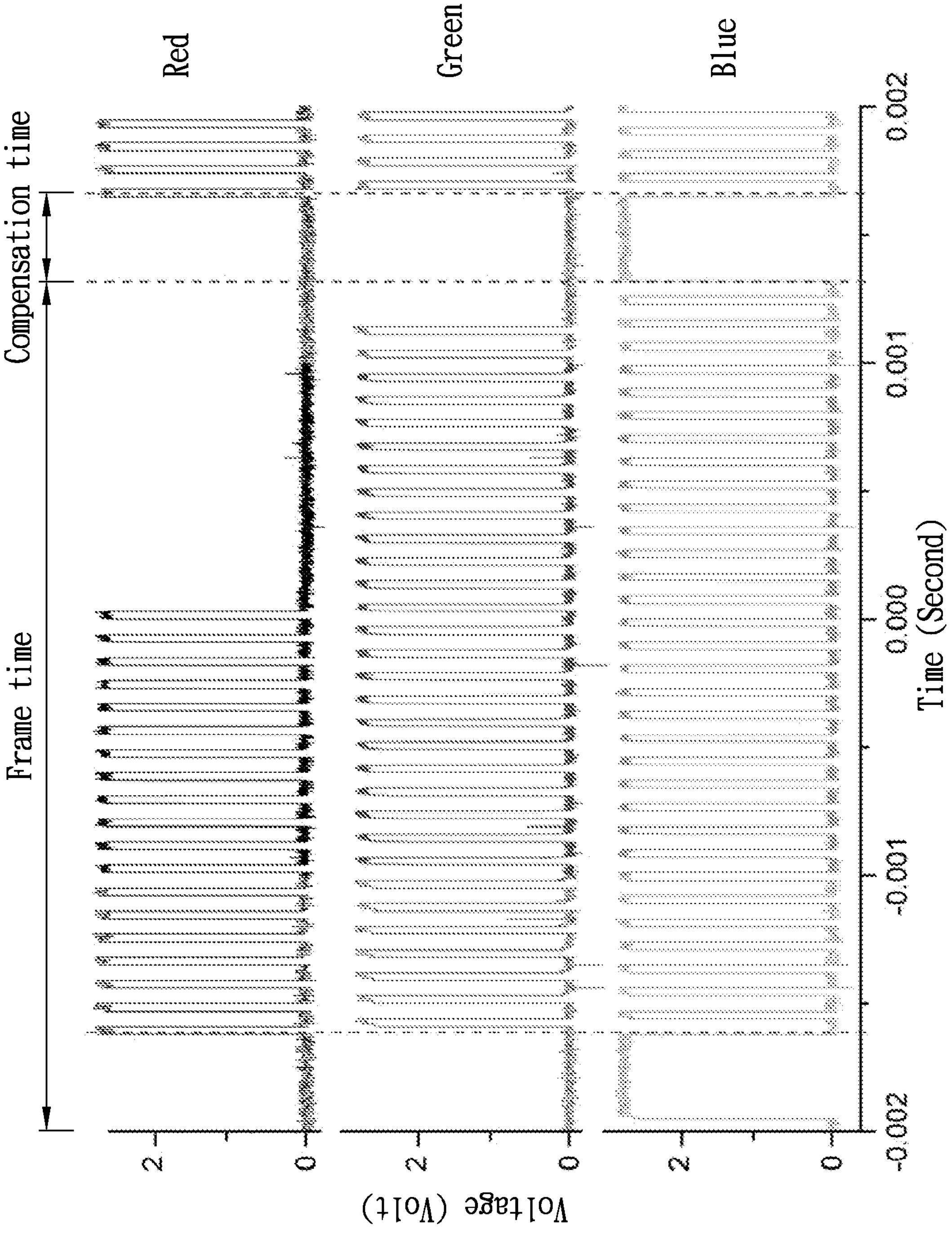
FIG. 8 shows a waveform chart of the driving signals for the backing light source according to the present invention.

FIG. 8 shows a waveform chart of the driving signals for the backing light source 20 according to the present invention. The turned-on duration (i.e., the duty time) of each LED is divided into N pieces of unit times (UT) and a compensation time. The turned-on duration of the LED 16A (blue diode) is relatively long, the sum of the unit times in the frame time is smaller than the turned-on duration, and the compensation time is used for compensation. In contrast, the turned-on durations of the LED 16B (green diode) and the LED 16C (red diode) are relatively short and are smaller than the sum of the unit times in the frame time, and the compensation time is set to zero.

Figure 9:
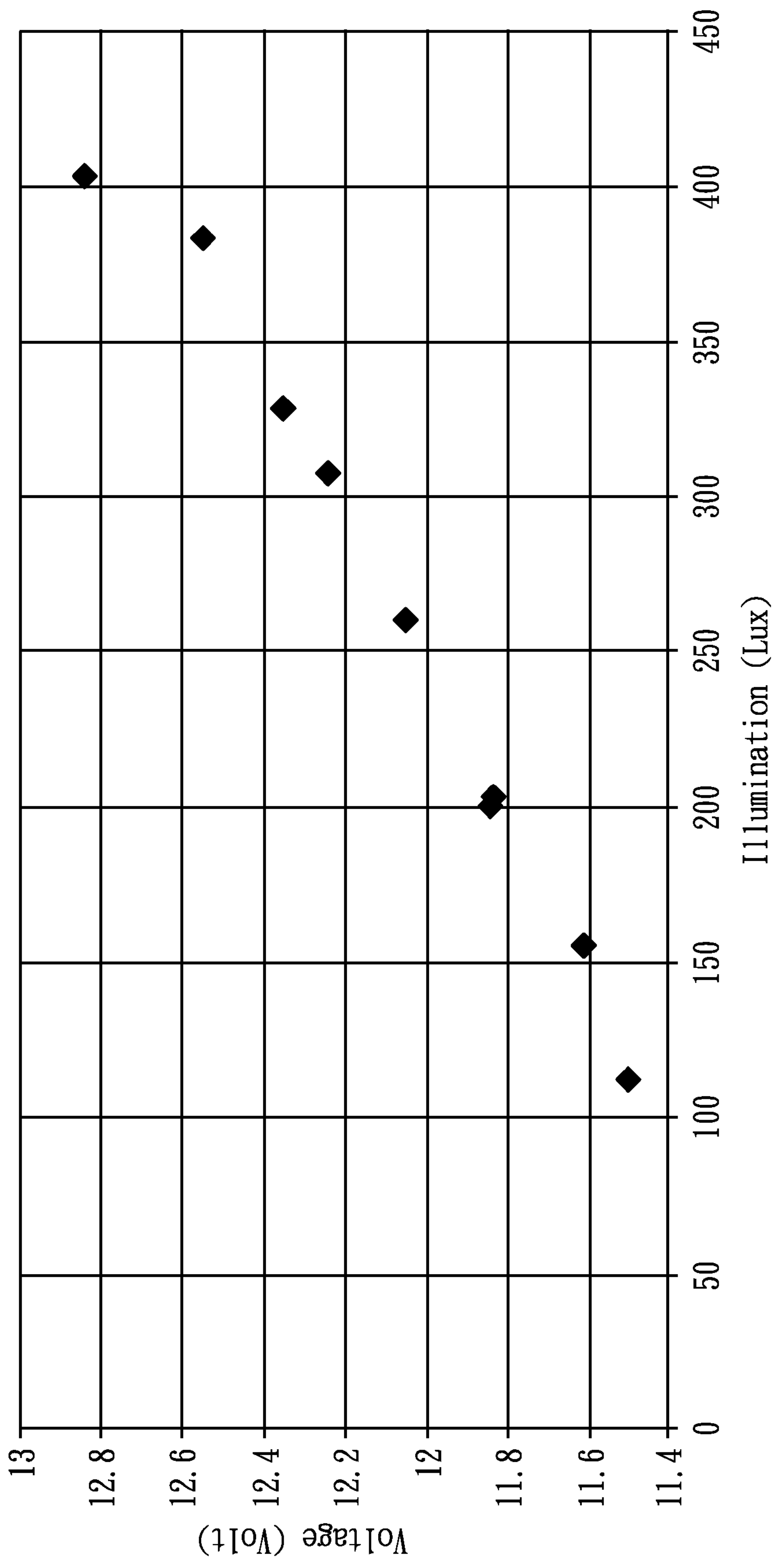
FIG. 9 shows the relationship of the driving voltage and the illumination of the LED.
Figure 11:
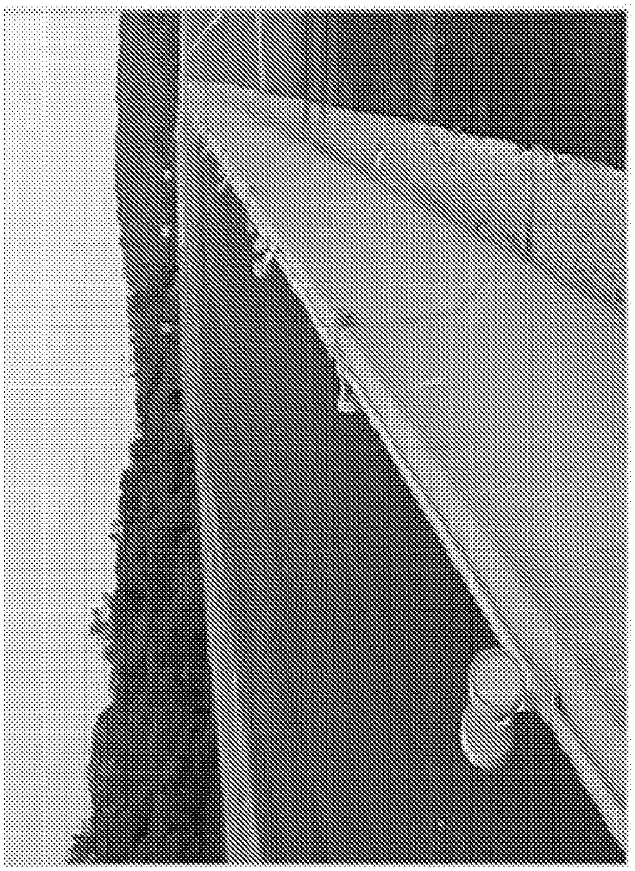
FIGS. 10 and 11 show the illumination of the backing light source before and after the voltage is raised, respectively.
Figure 10:
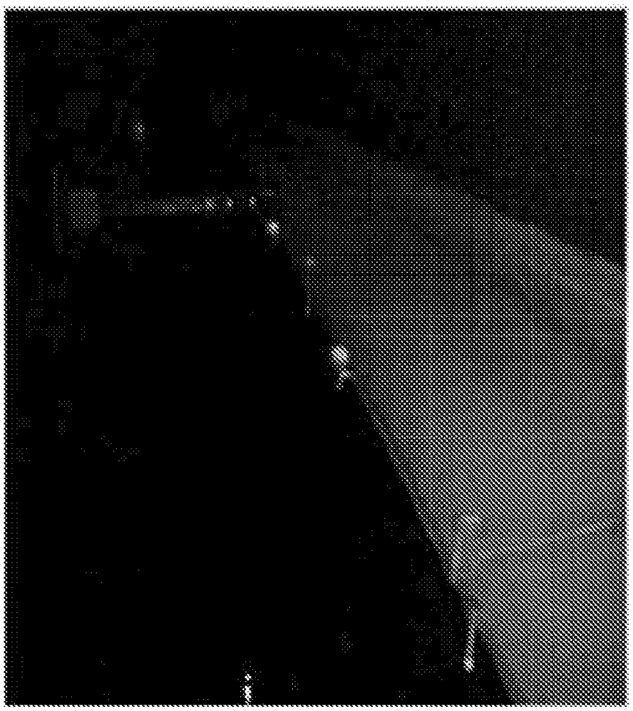

FIG. 9 shows the relationship of the driving voltage and the illumination of the LED. The illumination of the LED increases with the raising of the driving voltage. Once a predetermined voltage (for example, a PWM voltage) is applied to the driver 18 and a current is supplied, the LEDs 16A, 16B and 16C emit light beams. Since the illumination of the LED increases with the raising of the driving voltage, the illumination of the light source 20 may be greatly increased if the driving voltage of the LEDs 16A, 16B, and 16C is raised by 1 to 5%, as shown in FIG. 10 (before the voltage is raised) and FIG. 11 (after the voltage is raised). In addition, once the driving voltage of the driver 18 is raised, the driven unit time can be reduced to save electrical energy according to the present invention.

Figure 12:
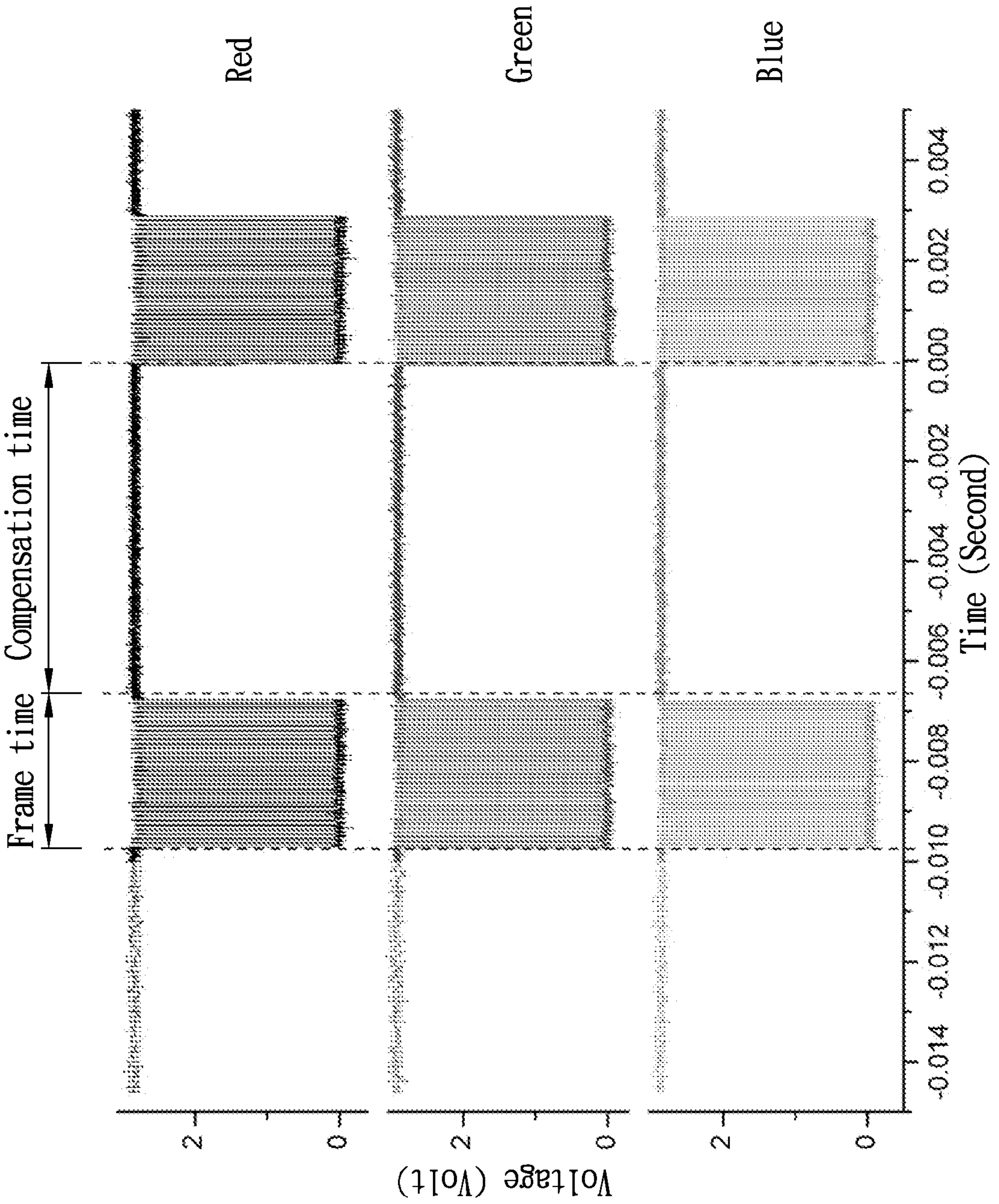
FIG. 12 shows a waveform chart of the driving signal according to the present invention.

FIG. 12 shows a waveform chart of the driving signal according to the present invention. The microprocessor 22 defines the unit time to be 33 microseconds, i.e., three units is approximately 100 microseconds, the brightness signal is set to 100% (full brightness), and the brightness is measured to be approximately 6000 nits. According to the driving method of the present invention, the frame time includes blue PWM signal with N1=256 pieces of unit times, green PWM signal with N2=256 pieces of unit times, and red PWM signal with N3=256 pieces of unit times, and the compensation time is about 7.3 milliseconds.

The measured current is 0.43 A and voltage is 3.53V for the blue diode, the measured current is 0.43 A and voltage is 3.54V for the green diode, and the measured current is 0.43 A and voltage is 3.04V for the red diode. According to the following equation, the consumed electrical power of the backing light source 20 is 17.4 W, which saves approximately 15% of the power as compared with 20.559 W in usual operation. That is, the present invention actually saves 15% of power, and the number of the power supply switching operations of the power supply 14 is reduced to ¼ of the original number. Consequently, the reliability of the system is enhanced, $$
\begin{aligned}
P &= V_{app} \times (I_{Blue} + I_{Green} + I_{Red}) + V_{app} \times (I_{Blue}) \\
&= V_{app}(2I_{Blue} + I_{Green} + I_{Red}).
\end{aligned}
$$

Compared with the prior art, the present invention divides the turned-on duration (i.e., the duty time) of each LED into N pieces of unit times (UT) and a compensation time, and the driver 18 is conducted according to the N pieces of unit times (UT) in the frame time to cause the current supplied by the power supply 14 to flow to the LEDs. If the frame time is not long enough to execute the N pieces of unit times (UT), the driver 18 uses the compensation time (CT) for compensation. In this manner, the current supplied by the power supply 14 in the frame time (FT) is constant, and the current supplied by the power supply 14 in the compensation time (CT) is also constant, which effectively reduces the electrical power for driving the LED array, and thereby providing the light source with the features of power saving and high reliability.

The above-described embodiments of the present invention are intended to be illustrative only. Numerous alternative embodiments may be devised by those skilled in the art without departing from the scope of the following claims.

What is claimed is:

1. A method for driving a light source, comprising the steps of:

setting a frame time (FT) and a unit time (UT) and calculating the number (M) of the unit time that the frame time can contain;

calculating turned-on numbers (Ni) and a compensation time (CTi) of a light-emitting device of the light source according to a turned-on duration (DTi) of the light-emitting device and the unit time (UT); and driving the light-emitting device to emit a light beam according to the turned-on numbers (Ni) and the compensation time (CTi).

2. The method for driving the light source as claimed in claim 1, wherein the number (M) of the unit time that the frame time can contain is calculated according to an equation M=FT/(P×UT), and P is a positive integer.

3. The method for driving the light source as claimed in claim 2, wherein the light source includes a plurality of light-emitting devices, and P represents the number of light-emitting devices.

4. The method for driving the light source as claimed in claim 1, wherein the step of calculating turned-on numbers (Ni) and a compensation time (CTi) of a light-emitting device of the light source according to a turned-on duration (DTi) of the light-emitting device and the unit time (UT) comprises the steps of:

receiving the turned-on duration (DTi) of the light-emitting device, and calculating the turned-on numbers (Ni) of the light-emitting device according to an equation Ni=DTi/UT;

checking if M is larger than the maximum value of Ni, and setting the compensation time (CTi) of the light-emitting device to zero if the checking result is yes;

setting the compensation time (CTi) to zero if the checking result is no and M is larger than or equal to Ni; and setting the compensation time according to the equation CTi=(Ni−M)×UT if the checking result is no and M is smaller than Ni.

5. The method for driving the light source as claimed in claim 1, wherein the step of calculating turned-on numbers (Ni) and a compensation time (CTi) of a light-emitting device of the light source according to a turned-on duration (DTi) of the light-emitting device and the unit time (UT) comprises the steps of:

(a) receiving the turned-on duration (DTi) of the light-emitting device, and calculating turned-on numbers (Ni) according to the equation Ni=DTi/UT;

(b) setting a compensation time (CTi) to zero if M is larger than or equal to Ni, and setting the compensation time according to the equation CTi=(Ni−M)×UT if M is smaller than Ni; and (c) repeating Steps (a) and (b) for a predetermined number of times.

6. The method for driving the light source as claimed in claim 1, wherein the light source comprises a red light-emitting device, a green light-emitting device and a blue light-emitting device.

7. The method for driving the light source as claimed in claim 1, wherein the light-emitting device is driven to the emit light beam according to the turned-on numbers (Ni), and then driven to emit the light beam according to the compensation time (CTi).

8. The method for driving the light source as claimed in claim 1, wherein the light-emitting device is driven to emit the light beam according to compensation time (CTi), and then driven to emit the light beam according to the turned-on numbers (Ni).

9. The method for driving the light source as claimed in claim 1, wherein the step of driving the light-emitting device to emit a light beam comprises applying a predetermined voltage to the light-emitting device.

10. The method for driving the light source as claimed in claim 9, wherein the step of driving the light-emitting device to emit a light beam comprises raising the predetermined voltage by 1 to 5%, and then applying the predetermined voltage to the light-emitting devices.

11. A method for driving a backing light source, comprising the steps of:

setting a frame time (FT) and a unit time (UT) and calculating the number (M) of the unit time that the frame time can contain;

calculating turned-on numbers (Ni) and a compensation time (CTi) of a light-emitting device of the backing light source according to a turned-on duration (DTi) of the light-emitting device and the unit time (UT); and driving the light-emitting device to emit a light beam according to the turned-on numbers (Ni) and the compensation time (CTi).

12. The method for driving the backing light source as claimed in claim 11, wherein the number (M) of the unit time that the frame time can contain is calculated according to the equation M=FT/(P×UT), and P is a positive integer.

13. The method for driving the backing light source as claimed in claim 11, wherein the backing light source comprises at least one light-emitting modules, and P represents the number of the light-emitting devices of the light-emitting module.

14. The method for driving the backing light source as claimed in claim 13, wherein the light-emitting module comprises a red light-emitting device, a green light-emitting device and a blue light-emitting device.

15. The method for driving the backing light source as claimed in claim 11, wherein the step of calculating turned-on numbers (Ni) and a compensation time (CTi) of a light-emitting device of the backing light source according to a turned-on duration (DTi) of the light-emitting device and the unit time (UT) comprises the steps of:

receiving the turned-on duration (DTi) of the light-emitting device, and calculating the turned-on numbers (Ni) of the light-emitting device according to the equation Ni=DTi/UT;

checking if M is larger than the maximum value of the Ni, and setting the compensation time (CTi) of the light-emitting device to zero if the checking result is yes;

setting the compensation time (CTi) to zero if the checking result is no and M is larger than or equal to Ni; and setting the compensation time according to an equation CTi=(Ni−M)×UT if the checking result is no and M is smaller than Ni.

16. The method for driving the backing light source as claimed in claim 11, wherein the step of calculating turned-on numbers (Ni) and a compensation time (CTi) of a light-emitting device of the backing light source according to a turned-on duration (DTi) of the light-emitting device and the unit time (UT) comprises the steps of:

(a) receiving the turned-on duration (DTi) of the light-emitting device, and calculating the turned-on numbers (Ni) according to an equation Ni=DTi/UT;

(b) setting a compensation time (CTi) to zero if M is larger than or equal to Ni, and setting the compensation time according to an equation CTi=(Ni−M)×UT if M is smaller than Ni; and (c) repeating steps (a) and (b) for a predetermined number of times.

17. The method for driving the backing light source as claimed in claim 11, wherein the light-emitting device is driven to emit the light beam according to the turned-on numbers (Ni), and then driven to emit the light beam according to the compensation time (CTi).

18. The method for driving the backing light source as claimed in claim 11, wherein the light-emitting device is driven to emit the light beam according to the compensation time (CTi), and then driven to emit the light beam according to the turned-on numbers (Ni).

19. The method for driving the backing light source as claimed in claim 11, wherein the step of driving the light-emitting device to emit a light beam comprises applying a predetermined voltage to the light-emitting devices.

20. The method for driving the backing light source as claimed in claim 19, wherein the step of driving the light-emitting device to emit a light beam comprises raising the predetermined voltage by 1 to 5%, and then applying the predetermined voltage to the light-emitting devices.

* * * * *

UNITED STATES PATENT AND TRADEMARK OFFICE

CERTIFICATE OF CORRECTION

PATENT NO. : 7,800,578 B2
APPLICATION NO. : 11/685972
DATED : September 21, 2010
INVENTOR(S) : Shih et al.

It is certified that error appears in the above-identified patent and that said Letters Patent is hereby corrected as shown below:

Title Page, Item [75] Inventor “Hsin Yu Tsai” should read -- Hsin Yu Tsal --

Signed and Sealed this

Seventh Day of December, 2010

David J. Kappos
*Director of the United States Patent and Trademark Office*

UNITED STATES PATENT AND TRADEMARK OFFICE

CERTIFICATE OF CORRECTION

PATENT NO. : 7,800,578 B2
APPLICATION NO. : 11/685972
DATED : September 21, 2010
INVENTOR(S) : Shih et al.

It is certified that error appears in the above-identified patent and that said Letters Patent is hereby corrected as shown below:

Title Page, Item [75] Inventor “Hsin Yu Tsal” should read -- Hsin Yu Tsai --

This certificate supersedes the Certificate of Correction issued December 7, 2010.

Signed and Sealed this
Fifteenth Day of February, 2011

David J. Kappos
*Director of the United States Patent and Trademark Office*

UNITED STATES PATENT AND TRADEMARK OFFICE

CERTIFICATE OF CORRECTION

PATENT NO. : 7,800,578 B2
APPLICATION NO. : 11/685972
DATED : September 21, 2010
INVENTOR(S) : Shih et al.

It is certified that error appears in the above-identified patent and that said Letters Patent is hereby corrected as shown below:

Title Page, Item [75] Inventor "Hsin Yu Tsal" should read -- Hsin Yun Tsai --

This certificate supersedes the Certificates of Correction issued December 7, 2010 and February 15, 2011.

Signed and Sealed this
Twelfth Day of April, 2011

David J. Kappos
*Director of the United States Patent and Trademark Office*